United States Patent
Lacroix

(10) Patent No.: US 10,201,794 B2
(45) Date of Patent: Feb. 12, 2019

(54) HIGH EFFICIENCY/LOW PRESSURE CATALYTIC CRACKING SPRAY NOZZLE ASSEMBLY

(71) Applicant: Spraying Systems Co., Wheaton, IL (US)

(72) Inventor: Mark Lacroix, Thornton, NH (US)

(73) Assignee: Spraying Systems Co., Wheaton, IL (US)

( * ) Notice: Subject to any disclaimer, the term of this patent is extended or adjusted under 35 U.S.C. 154(b) by 31 days.

(21) Appl. No.: 15/023,472

(22) PCT Filed: Sep. 18, 2014

(86) PCT No.: PCT/US2014/056346
§ 371 (c)(1),
(2) Date: Mar. 21, 2016

(87) PCT Pub. No.: WO2015/042283
PCT Pub. Date: Mar. 26, 2015

(65) Prior Publication Data
US 2016/0199805 A1    Jul. 14, 2016

Related U.S. Application Data

(60) Provisional application No. 61/880,320, filed on Sep. 20, 2013.

(51) Int. Cl.
*B01J 8/22* (2006.01)
*B01J 8/18* (2006.01)
*B05B 7/04* (2006.01)
*C10G 11/18* (2006.01)
*B05B 1/04* (2006.01)

(52) U.S. Cl.
CPC .............. *B01J 8/22* (2013.01); *B01J 8/1818* (2013.01); *B01J 8/1827* (2013.01); *B01J 8/1845* (2013.01);
(Continued)

(58) Field of Classification Search
CPC .................. B01J 8/1818; B01J 8/1845; B01J 2208/00902; B01J 8/22; B01J 8/1827;
(Continued)

(56) References Cited

U.S. PATENT DOCUMENTS 4,343,434 A * 8/1982 Haruch .................. B05B 1/265
239/390
4,824,557 A    4/1989 Cartmell et al.
(Continued)

FOREIGN PATENT DOCUMENTS

JP    2002 534556 A    10/2002
WO    WO 01/14500 A1    3/2001

OTHER PUBLICATIONS

International Search Report dated Dec. 31, 2014, in International Patent Application No. PCT/US2014/056346.
(Continued)

*Primary Examiner* — Darren W Gorman
*Assistant Examiner* — Juan C Barrera
(74) *Attorney, Agent, or Firm* — Leydig, Voit & Mayer, Ltd.

(57) ABSTRACT

A gas assisted liquid spray nozzle assembly having a nozzle body that defines a mixing zone, a liquid inlet communicating with the mixing zone from an end, and a pressurized gas inlet communicating with the mixing chamber from an upstream side. The liquid inlet includes a liquid injector extending into the nozzle body having a liquid inlet extension passage and a plurality of discharge orifices adjacent a closed downstream end which define an impingement surface for directing liquid into the mixing zone in transverse relation to a central axis of the mixing zone. The nozzle body and liquid injector define a plurality of concentrating gas discharge passages at respective locations of the injector liquid discharge orifices for causing individual pressurized
(Continued)

gas to directly interact with transversely directed liquid into the mixing zone for enhanced atomization and ultimate discharge from a downstream spray tip.

15 Claims, 5 Drawing Sheets

(52) U.S. Cl.
CPC ............ *B05B 7/0466* (2013.01); *C10G 11/18* (2013.01); *B01J 2208/00902* (2013.01); *B05B 1/044* (2013.01)

(58) Field of Classification Search
CPC .......... B01J 8/20; B05B 7/0466; B05B 7/025; B05B 7/04; B05B 7/0408; B05B 7/0416; B05B 7/0458; B05B 7/0483; B05B 1/044; C10G 11/18
USPC ....... 239/590, 590.3, 590.5, 418–434.5, 518, 239/520, 521, 524, 296
See application file for complete search history.

(56) References Cited

U.S. PATENT DOCUMENTS 5,306,418 A 4/1994 Dou et al.
5,318,691 A 6/1994 Muldowney
5,553,785 A * 9/1996 Haruch ................ B05B 1/3436 239/432
5,868,321 A * 2/1999 Haruch ................ B05B 1/3436 239/399
5,921,472 A * 7/1999 Haruch ................. B01J 8/1827 239/432
5,948,241 A 9/1999 Hartley
6,322,003 B1 * 11/2001 Haruch ................ B05B 7/0458 239/290
7,036,753 B2 * 5/2006 Huffman .............. B05B 7/0466 239/427
7,674,449 B2 * 3/2010 Randolph, III .......... B01J 4/002 423/522
8,286,836 B2 * 10/2012 Yates ................... B05B 7/0037 222/145.5
8,444,061 B2 * 5/2013 Van Den Berg ...... B05B 7/0466 239/105
9,168,545 B2 * 10/2015 Vidusek ................... B05B 7/10
2002/0153428 A1 10/2002 Koveal et al.
2002/0189974 A1 12/2002 Adamson et al.
2013/0186982 A1 * 7/2013 Vidusek ............... B05B 7/0433 239/429

OTHER PUBLICATIONS

European Search Report dated Mar. 17, 2017, in European Patent Application No. 14845461.4.
First Office Action dated Jun. 2, 2017, in Chinese Patent Application No. 2014800633040.

* cited by examiner

HIGH EFFICIENCY/LOW PRESSURE CATALYTIC CRACKING SPRAY NOZZLE ASSEMBLY

CROSS-REFERENCE TO RELATED APPLICATIONS

This patent application claims the benefit of U.S. Provisional Patent Application No. 61/880,320, filed Sep. 20, 2013, which is incorporated by reference.

FIELD OF THE INVENTION

The present invention relates generally to liquid spray nozzles, and more particularly, to spray nozzle assemblies particularly adapted for atomizing and spraying a liquid feed to a fluidized catalytic cracking riser reactor.

BACKGROUND OF THE INVENTION

A spray nozzle assembly of the foregoing type is shown and described in U.S. Pat. No. 5,921,472, the disclosure of which is incorporated by reference. Such spray nozzle assemblies typically include a nozzle body which defines a mixing chamber into which a liquid hydrocarbon and pressurized gas, such as steam, are introduced and within which the liquid hydrocarbon is atomized. To enhance liquid atomization within the mixing chamber, an impingement pin extends into the chamber and defines liquid impingement surface on the center line of the mixing chamber in diametrically opposed relation to the liquid inlet against which a pressurized liquid stream impinges and is transversely dispersed and across which pressurized steam from a gas inlet is directed for further interaction and shearing of the liquid into fine droplets. The atomized liquid within the mixing chamber is directed under the force of the pressurized steam through an elongated tubular barrel, commonly disposed within a wall of the catalytic reactor riser, for discharge from a spray tip at a downstream end thereof within the riser. Notwithstanding passage through the elongated tubular barrel the liquid must discharge as a very fine liquid particle spray for optimum performance. To efficiently breakup and transmit the liquid hydrocarbon, the steam cross flow must be at a high volume and pressure, approximately 110 psi, and the liquid pressure must be kept at approximately the same or greater pressure.

In such spray nozzle assemblies, the liquid hydrocarbon flow stream must pass through half the diameter of the mixing chamber before it impacts the impingement pin. Particularly in spray nozzle assemblies with relatively large diameter mixing chambers, such as those having a mixing chamber of four inches and more in diameter, there can be a tendency for the liquid hydrocarbon flow stream introduced into the mixing chamber to only partially impact the impingement surface of the impingement pin. The reason for this is that the liquid flow stream must pass a significant distance through the mixing chamber where it is subjected to a heavy cross flow of steam before impacting the impingement surface. This tends to cause a shift in the liquid flow stream away from the center of the impingement surface, the magnitude of which is dependent upon the velocities of the pressurized steam and liquid flow streams for a particular setup. The shift prevents a portion of the liquid hydrocarbon flow stream from being shattered against the impingement pin, resulting in a significant increase in droplet size for a portion of the spray volume that adversely affects the spray performance. In order to overcome such shift in the liquid flow stream introduced into the mixing chamber, heretofore it has been necessary to increase the liquid pressure even more to overcome the effect of the steam cross flow. This necessitates the need for larger and higher pressure process pumps that are more expensive to operate and more susceptible to breakdowns. On the other hand, operation of such spray nozzles at lower pressures significantly effects spray performance and can create clogging, particularly when spraying heavier crude oils such as resids and petroleum bottoms.

SUMMARY AND OBJECTS OF THE INVENTION

It is an object of the present invention to provide a liquid hydrocarbon spray nozzle assembly that is adapted for more effective and finer liquid atomization and improved spray performance in catalytic cracking reactors.

Another object is to provide a spray nozzle assembly as characterized above that can be efficiently operated at lower liquid pressures, nearly half that of conventional catalytic cracking spray nozzle assemblies, with lesser expensive processing equipment.

A further object is to provide a spray nozzle assembly of the foregoing type in which the liquid hydrocarbon flow stream introduced into the mixing chamber of the spray nozzle body is not adversely effected by the pressurized steam prior to engaging an impingement surface that shatters and transversely directs the liquid within a mixing zone.

Still another object to provide a spray nozzle assembly of the above kind that reduces the amount of steam necessary for effective liquid atomization.

Yet a further object is to provide a spray nozzle assembly of such type that is effective for efficiently atomizing relatively heavy crude oils, such as resids and petroleum bottoms, without clogging or plugging of the spray nozzle components.

Another object is to provide such a spray nozzle assembly that has a relatively simple and durable design which lends itself to economical manufacture.

Other objects and advantages of the invention will become apparent upon reading the following detailed description and upon reference to the drawings, in which:

Figure 1:
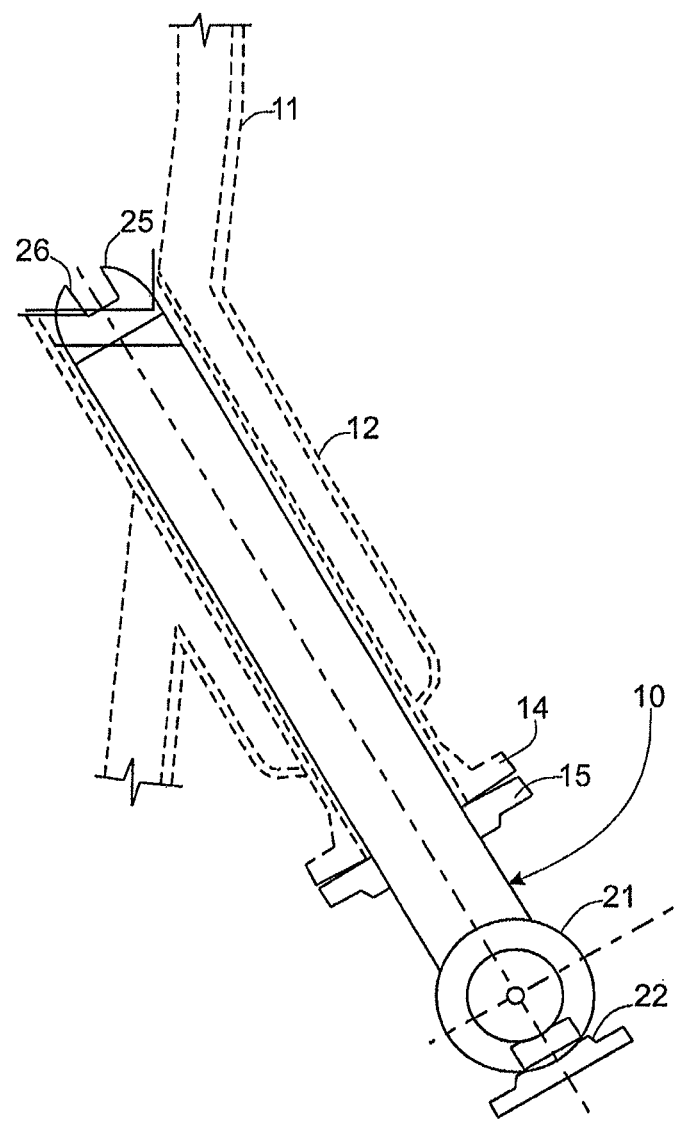
FIG. 1 is a schematic depiction of a spray nozzle assembly in accordance with the present invention mounted within the wall of a riser of a catalytic cracking reactor.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention. In that regard, while the illustrated spray nozzle assembly is particularly effective for atomizing and spraying liquid hydrocarbons in catalytic cracking systems, it will be understood that the utility of the nozzle assembly is not limited to that usage.

DESCRIPTION OF THE PREFERRED EMBODIMENT

Referring now more particularly to the drawings there is shown and illustrative spray nozzle assembly 10 in accordance with the invention mounted in a conventional manner in an insulated wall 11 (shown in phantom) of a riser of a fluidized catalytic reactor. The spray nozzle assembly 10 is supported in a tubular sleeve 12 fixed within the wall 11 at an acute angle to the vertical for discharging atomized liquid hydrocarbon upwardly into the riser. The tubular sleeve 12 in this case has an outwardly extending flange 14 to which a support flange 15 fixed to the spray nozzle assembly 10 may be secured.

Figure 2:
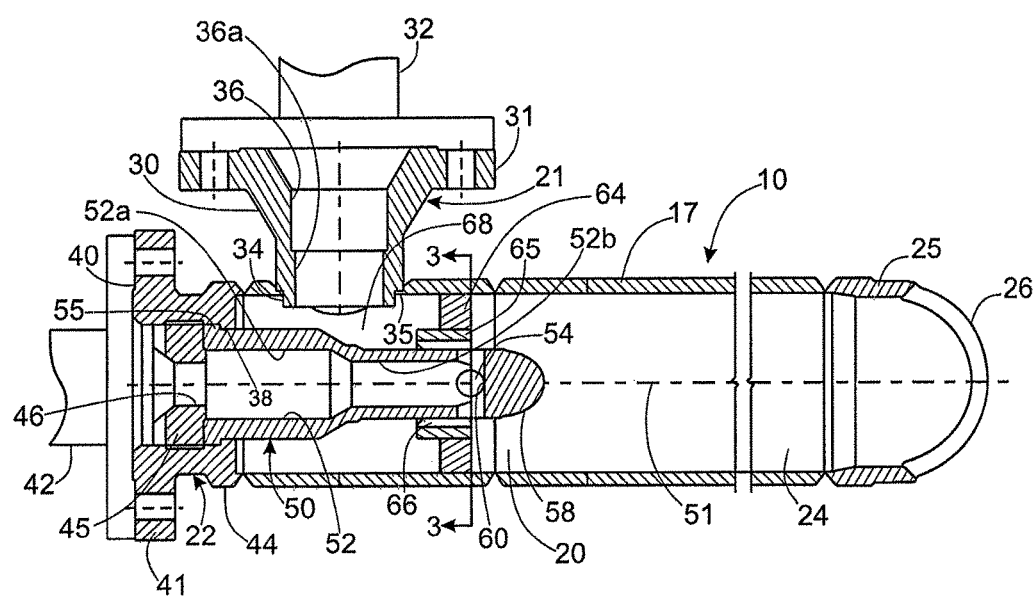
FIG. 2 is an enlarged longitudinal section of the spray nozzle assembly shown in FIG. 1.

The illustrated spray nozzle assembly 10, as best depicted in FIG. 2, basically comprises a nozzle body in the form of an elongated tubular member 17 that defines a mixing zone 20 adjacent an upstream end having a pressurized steam inlet 21 and a liquid hydrocarbon inlet 22 disposed on an outer side of the wall 11 of the riser and an elongated barrel extension zone 24 communicating with the mixing zone 20 disposed in and extending downstream through the nozzle support sleeve 12 and riser wall 11. A spray tip 25 having one or more discharge orifices 26 is supported at a downstream end of the tubular member 17 within the riser for discharging and directing the atomized liquid spray. The tubular member 17 may be one or more lengths of pipe, such as Schedule 80 steel pipe, having an internal diameter of between about 2 to 8 inches.

In accordance with the invention, the spray nozzle assembly is operable for atomizing liquid hydrocarbon into a finer liquid particle discharge for more efficient spray performance while operating at significantly lower liquid pressures. To this end, the liquid hydrocarbon inlet 22 is disposed at an upstream end of the nozzle body tubular member 17 and the steam inlet 21 communicates with through a side wall of the tubular member 17. In the illustrated embodiment, the steam inlet 21 includes a fitting 30 having a mounting clamp 31 for securement to a supply line 32 coupled to a steam or other gas supply and a downstream end with a counter bore section 34 that fits within an opening 35 of the tubular member 17, which in this case is formed with an inwardly tapered conical side wall for facilitating securement of the fitting 30 to the tubular member 17 by an appropriate annular weldment. The stem inlet fitting 30 has a central flow passageway 36 with a steam inlet passage section 36a communicating through the tubular member 17.

The liquid inlet 22, like the steam inlet 21, includes a fitting 40 having a mounting flange 41 for securement to a liquid hydrocarbon supply line 42 coupled to a suitable liquid hydrocarbon supply and a downstream cylindrical section 44 for securement to an upstream axial end of the tubular member 17. The ends of the liquid inlet fitting 40 and the tubular member 17 are chamfered for facilitating securement by a weldment. The liquid inlet fitting 22 includes an orifice member 45 for defining a liquid inlet passage 46 of predetermined diameter through which the feed liquid is accelerated. The orifice member 45 in this instance has a conical entry section for channeling the pressurized liquid flow stream into and through the orifice member passage 46.

In carrying out this embodiment, the liquid inlet 22 includes an elongated closed end liquid injector 50 extending into the mixing zone 20 along a central axis 51 thereof, which has a liquid extension passageway 52 communicating between the orifice member 45 and a plurality of discharge orifices 54 adjacent a downstream end of the extension passageway 52 which transversely direct liquid into the mixing zone 20 in perpendicular relation to the central axis 51. The liquid injector 50 in this case is a separate tubular member having a closed downstream end fixedly mounted with an upstream end in abutting relation to a downstream end of the liquid orifice member 45. The liquid injector 50 has an upstream outwardly extending annular flange 55 that is clamped between a shoulder defined by an annular end 38 of the fitting 40 and the downstream end of the orifice member 45, which is threadedly mounted within the fitting 40. It will be understood that alternatively the orifice member 45 and the liquid injector 50 could be made as a single part. In this instance, the central extension passageway 52 of the liquid injector 50 has an upstream passage section 52a larger in diameter than the orifice member passageway 46 for allowing unimpeded flow of liquid hydrocarbon into the injector 50, which then is channeled into a smaller downstream passage section 52b.

In further keeping with this embodiment, the liquid injector 50 has a closed downstream terminal end 58 with an "x" configuration of the liquid discharge orifices 54. The discharge orifices 54 in this case are defined by cylindrical passages that extend radially outwardly in perpendicular relation to the central axis 51 and define a flat internal impingement surface 60 perpendicular to the central axis 51 against which pressurized liquid hydrocarbon communicating through the extension passageway 52 impinges and is transversely directed and spread out into the mixing zone 20.

In further carrying out this embodiment, an annular steam wall 64 and orifice ring 65 are disposed within the tubular member 17 adjacent a downstream end of the liquid injector 50, which supports the liquid injector 50 and defines a plurality of concentrating steam discharge orifices 66 at the specific locations of each injector discharge orifice 54 for causing steam to directly interact with and atomize the liquid flow streams discharging from the liquid injector 50. The annular steam wall 64 in this case is a plate like wall member welded within the tubular body member 17 for defining an annular steam chamber 68 about the liquid injector 50 upstream of the liquid discharge orifices 54 into which steam from the steam inlet 21 is directed. The orifice ring 65 in this case is disposed within the annular steam wall 64 and has an axial length of about twice the width of the wall 64 such that a portion extends a length upstream of the annular steam wall 64.

For defining the concentrating steam discharge orifices 66, a downstream end section of the liquid injector 50 is formed with external flats 70 across the liquid discharge orifices 54 and angled or rounded corners 71 connecting the flats 70. The orifice ring 65 has a generally rectangular internal opening with opposing sides formed with recesses 74 supporting the corners 71 of the liquid injector 50 and with rounded corners 75 adjacent the liquid injector flats 70 for defining the steam discharge orifices 66 between the flats 70 and rounded corners 75 in aligned relation to liquid discharge orifices 54. The steam discharge orifices 66 defined by the steam orifice ring 65 and liquid injector flats 70 in this case are aligned with and partially overlap each liquid injector discharge orifice 54. Preferably, the downstream end of the steam orifice ring 65 is centered over or slightly upstream of the liquid discharge orifices 54.

As can be seen, since the concentrating steam discharge orifices 66 are aligned precisely with the liquid discharge orifices 54 of the liquid injector 50, they will direct steam over liquid discharge orifices 54 for direct shearing and atomizing the liquid stream at the precise location where the liquid hydrocarbon exits the liquid injector 50. Since all of the energy of the steam is focused at that location, the liquid can be atomized into very fine liquid particles for transmission to the spray tip 25. Since the concentrating steam orifices 66 are relatively small, the steam inlet passage 36*a* may be relatively large, such as one half the diameter or greater than the steam chamber, for achieving the desired velocity of steam through the orifices 66.

Figure 3:
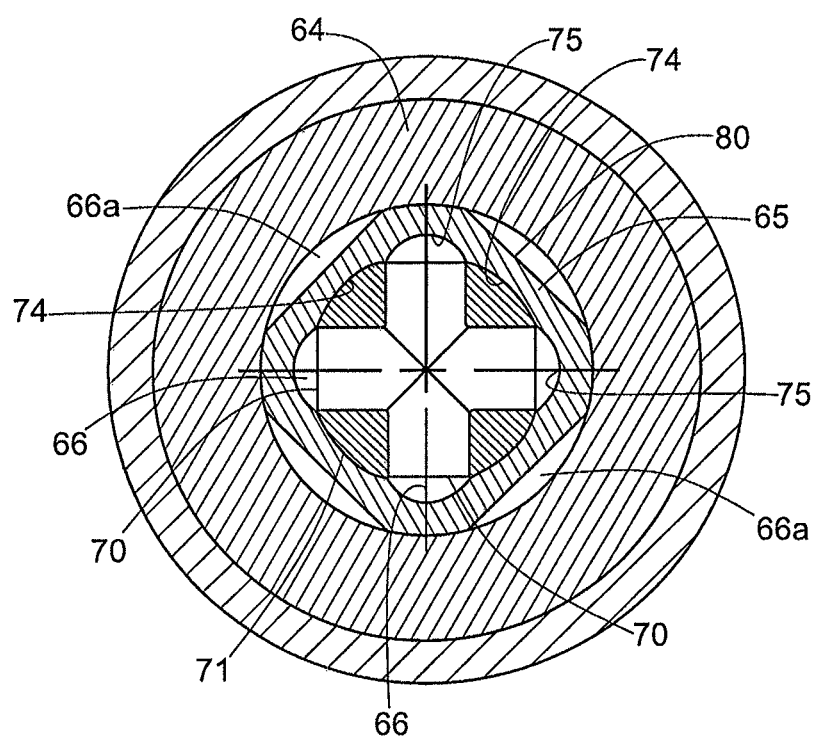
FIG. 3 is an enlarged transverse section taken in the plane of line 3-3 in FIG. 2.
Figure 4:
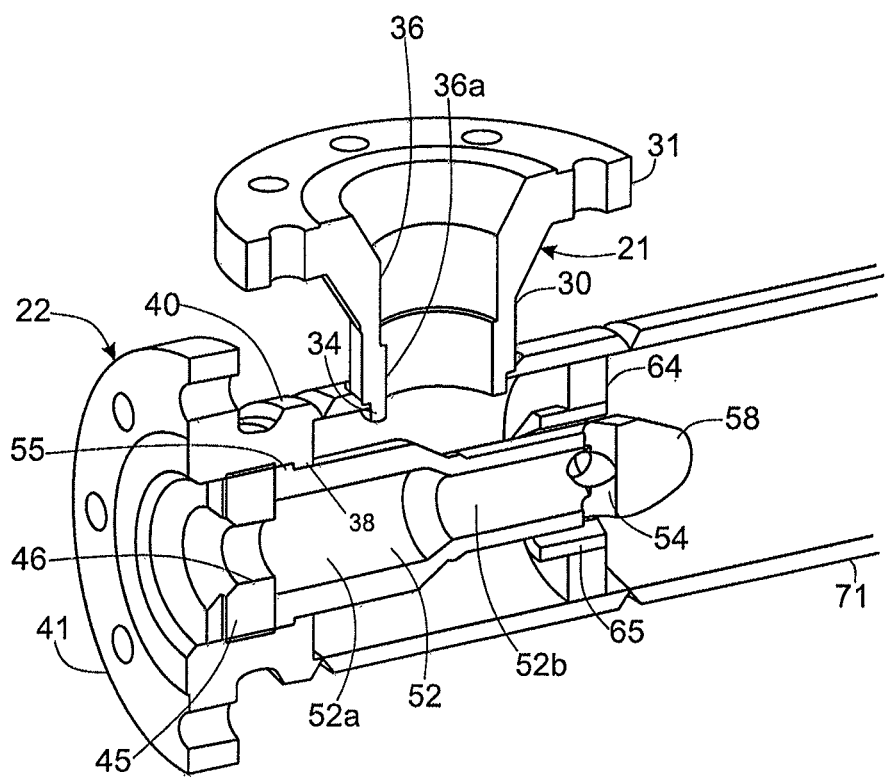
FIG. 4 is an enlarged perspective of an upstream end of the illustrated spray nozzle assembly.
Figure 5:
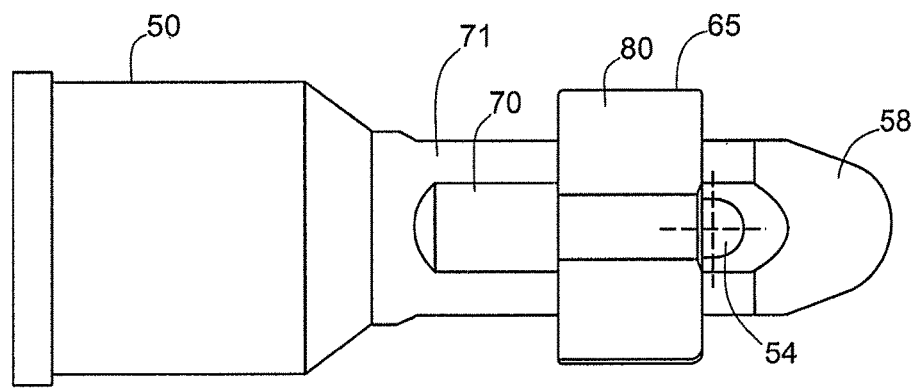
FIG. 5 is a side view of the liquid injector and associated steam orifice ring subassembly of the illustrated spray nozzle assembly.

It has been found that the droplet size of the atomized liquid further can be varied by changing the area of the steam orifices 66. For effecting smaller atomized liquid droplets, the concentrating steam discharge orifices 66 may be enlarged such as by changing the size of the injector flats 70 in relation to the internal opening of the orifice ring 65. In addition, auxiliary steam discharge orifices 66*a* may be provided about the outer perimeter of the steam orifice ring 65 by forming the outer perimeter of the ring 65 with flats 80, as depicted in FIG. 3. Preferably, the flats 80 are disposed radially outwardly of the corners 71 of the liquid injector 50 so as to space the auxiliary steam discharge orifices 66*a* circumferentially between the inner steam discharge orifices 66.

The steam orifice ring 65 preferably is welded to the corners 71 of the liquid injector 50 for maintaining proper orientation of the ring 65 with respect to the injector 50. This further enables easy assembly of the liquid injector 50 and steam orifice ring 65 or a subassembly into the tubular member 17 of the nozzle body and the central opening of the steam chamber wall 64. The downstream end 58 of the liquid injector 50 and the steam orifice ring 65 can be mounted in the central opening of the steam chamber wall 64 during assembly with a slip fit which will allow the injector 50 and orifice ring 65 assembly to thermally expand or contract without restriction. The end 58 of the liquid injector 50 protruding through the steam orifice ring 65 and chamber wall 64 in this case is rounded for facilitating direction of the atomized liquid downstream into the barrel zone 24 of the nozzle body.

In operation, it will be seen that steam directed into the steam inlet 21 will enter the steam chamber 68 defined upstream of the steam chamber wall 64 and will be directed through the four circumferentially spaced concentrating steam discharge orifices 66 at the precise location of the liquid injector discharge orifices 54 for enhanced interaction and atomization of liquid discharging from the liquid injector 50 following impingement upon the internal impingement surface 60 of the liquid injector 50. The resulting increased atomization efficiency enables the spray nozzle assembly to be operated at liquid pressures as low as 60 psi, or nearly half that the pressure requirements of conventional catalytic cracking spray nozzle assemblies. The focused direction of steam from the orifice ring 65 also reduces the quantity of steam necessary for effective atomization. The more efficient pressurized air atomization of the liquid hydrocarbon further is effective for breaking up even heavier crude oils, such as resids and petroleum bottoms, without plugging or clogging of the nozzle components. Yet the spray nozzle assembly still has a very simple and durable design which lends itself to economical manufacture and reliable usage.

The invention claimed is:

1. A catalytic cracking system comprising: a riser, a spray nozzle assembly having a nozzle body supported within a wall of the riser for discharging atomized liquid hydrocarbon into the riser, said nozzle body defining a mixing zone and an elongated barrel extension zone longer in length than the mixing zone extending downstream and in communication with said mixing zone extending through said riser wall, a liquid hydrocarbon inlet outside said riser wall connected to a liquid hydrocarbon supply for directing a pressurized liquid hydrocarbon into said mixing zone, a steam inlet outside said riser wall connected to a pressurized steam supply for directing pressurized steam into said mixing zone, said liquid hydrocarbon inlet communicating with an elongated liquid injector disposed upstream of said barrel extension zone extending into the mixing zone along a central axis of the mixing zone, said nozzle body defining an annular gas chamber upstream of said barrel extension zone communicating with said steam inlet and surrounding said liquid injector, said liquid injector having a liquid inlet extension passageway and a plurality of discharge orifices adjacent to a downstream end of said extension passageway for directing liquid hydrocarbon from said extension passageway into the mixing zone in transverse relation to the central axis of the mixing zone, said nozzle body and liquid injector defining a plurality of individual concentrating steam discharge passages at a downstream end of said gas chamber each at a location of and aligned with a respective injector liquid discharge orifice for causing individual pressurized steam streams to directly interact with liquid hydrocarbon transversely directed into said mixing zone from the liquid injector discharge orifices and for directing atomized liquid hydrocarbon through said barrel extension zone, and a spray tip mounted at a downstream end of said barrel zone having a discharge orifice through which atomized liquid hydrocarbon directed through said barrel zone is discharged in a predetermined spray pattern.

2. The catalytic cracking system of claim 1 in which said steam inlet communicates with said mixing zone through a side wall of the nozzle body.

3. The catalytic cracking system of claim 1 in which said liquid injector has a closed downstream end which defines an internal impingement surface against which liquid hydrocarbon directed through said liquid injector extension passageway impinges and is transversely directed outwardly through said liquid injector discharge orifices.

4. The catalytic cracking system of claim 3 in which said impingement surface is defined by a plurality of said liquid injector discharge orifices extending transversely through the liquid injector adjacent a downstream end thereof.

5. The catalytic cracking system of claim 3 in which said impingement surface is defined by an x-configuration of said injector liquid discharge orifices.

6. The catalytic cracking system of claim 1 in which said liquid hydrocarbon inlet includes an orifice member that defines a predetermined sized liquid inlet passage, and said liquid injector is a separate tubular member mounted downstream of said orifice member.

7. The catalytic cracking system of claim 1 in which said plurality of concentrating steam discharge passages are defined between said liquid injector and a ring disposed within said nozzle body about said liquid injector at a downstream end of said annular gas chamber.

8. The catalytic cracking system of claim 7 in which said liquid injector is formed with external flats across said liquid discharge orifices, and said concentrating steam passages are defined between said external flats of said injector and an interior of said ring.

9. The catalytic cracking system of claim 1 in which said liquid injector is supported within said nozzle body at a downstream end by an annular wall which defines a downstream end of said annular gas chamber, and said plurality of concentrating steam discharge passages communicate between said annular gas chamber and said barrel extension zone.

10. The catalytic cracking system of claim 9 including a ring supported within said annular wall, and said plurality of concentrating steam discharge passages are defined between said ring and a downstream end of said elongated liquid injector.

11. The catalytic cracking system of claim 10 in which said ring extends upstream of said annular wall.

12. The catalytic cracking system of claim 10 in which said liquid injector is formed with external flats across said injector liquid discharge orifices, and said concentrating steam discharge passages are defined between said external flats and said ring.

13. The catalytic cracking system of claim 1 in which said injector liquid discharge orifices define a flat internal impingement surface perpendicular to said central axis of said mixing zone against which pressurized liquid hydrocarbon directed through said liquid extension passageway impinges and is transversely directed.

14. The catalytic cracking system of claim 1 in which said nozzle body is in the form of a one piece hollow cylindrical tubular member.

15. The catalytic cracking systems claim 1 in which said liquid injector is disposed within said nozzle body at a location outside said riser wall.

* * * * *